United States Patent [19]
Hartshorn et al.

[11] 4,324,691
[45] Apr. 13, 1982

[54] CATALYST COMPONENT

[75] Inventors: Angus J. Hartshorn, Runcorn; Eric Jones, Kelsall, both of England

[73] Assignee: Imperial Chemical Industries Limited, London, England

[21] Appl. No.: 164,928

[22] Filed: Jul. 1, 1980

[30] Foreign Application Priority Data

Jan. 10, 1980 [GB] United Kingdom ............... 00889/80
Jun. 6, 1980 [GB] United Kingdom ............... 18583/80

[51] Int. Cl.³ ................................................ C08F 4/64
[52] U.S. Cl. ............................ 252/429 B; 252/429 C; 526/114; 526/116; 526/119; 526/129; 526/137; 526/151
[58] Field of Search ........... 252/429 B, 429 C, 431 R, 252/431 C, 431 N, 431 P

[56] References Cited

U.S. PATENT DOCUMENTS

| 3,222,296 | 12/1965 | Aftandilian ..................... 252/429 B |
| 3,400,110 | 9/1968 | Dassesse et al. ............. 252/429 C X |
| 3,663,451 | 5/1972 | Hill .............................. 252/429 B X |
| 3,708,465 | 1/1973 | Dietrich et al. ............ 252/429 B X |
| 4,130,699 | 12/1978 | Hoff et al. ................... 252/429 B X |
| 4,135,046 | 1/1979 | Harris et al. ................ 252/429 B X |
| 4,136,058 | 1/1979 | Harris et al. ..................... 252/429 B |
| 4,154,701 | 5/1979 | Melquist .......................... 252/429 B |
| 4,229,558 | 10/1980 | Kakogawa et al. ........ 252/429 B X |
| 4,250,288 | 2/1981 | Lowery et al. ............. 252/429 B X |

FOREIGN PATENT DOCUMENTS 914283 1/1963 United Kingdom .
1120079 7/1968 United Kingdom .

Primary Examiner—Patrick Garvin
Attorney, Agent, or Firm—Cushman, Darby & Cushman

[57] ABSTRACT

A component for an olefin polymerisation catalyst which component is the product of treating a particulate support material with (a) an organomagnesium compound, (b) a transition metal compound of Groups IVA, VA or VIA, e.g. bis-butoxy titanium dichloride, (c) a pacifying agent, e.g. HCl and (d) optionally an aluminium compound, e.g. ethyl aluminium dichloride, an organometallic compound, e.g. zirconium tetrabenzyl, a halogenating agent e.g. silicon tetrachloride, or a Lewis Base compound, e.g. ethyl benzoate.

30 Claims, No Drawings

CATALYST COMPONENT

The present invention relates to a component of an olefin polymerisation catalyst, a process for the production thereof, polymerisation catalysts including the said component and an olefin polymerisation process using such catalysts.

We have found that so-called Ziegler-Natta catalyst components obtained by treating a particulate support material with an organomagnesium compound and a compound of a transition metal of Groups IVA to VIA of the Periodic Table may be treated with a pacifying agent as hereinafter defined to reduce or remove the polymerisation activity of the catalyst component and/or to increase the activity of catalysts prepared therefrom.

Accordingly, one aspect of the present invention provides a catalyst component which is the product of treating a particulate support material, preferably having a reactive surface (as hereinafter defined) with (a) at least one organomagnesium compound,
(b) at least one transition metal compound of Groups IVA, VA or VIA of the Periodic Table,
(c) at least one pacifying agent, and
(d) optionally one or more compounds selected from the group consisting of
  (i) an aluminium compound of the general formula:

$$R_nAlY_{3-n}$$

wherein
R, each of which may be the same or different, represents a hydrocarbyl group, or substituted hydrocarbyl group, such as alkyl, aryl, cycloalkyl, aralkyl, alkenyl or alkadienyl,
n is 0, 1, 2, 3 or a fraction less than 3, and
Y is a singly charged ligand such as hydride, fluoride, chloride, bromide, iodide or oxyhydrocarbyl,
  (ii) an organometallic compound of the general formula:

$$R_m^1MX_p$$

wherein
M is a metal of Groups IA, IIA, IIB, IIIB, IVA, VA or VIA of the Periodic Table,
$R^1$ is a hydrocarbyl or a substituted hydrocarbyl group,
X is a singly charged anionic ligand or a monodentate neutral ligand,
m is an integer up to the highest valency of the metal M and
p is 0 or an integer up to 2 less than the valency of the metal M, except when M is a metal from Group VIA p is always 0, and
when M is a metal Groups IVA, VA or VIA m has a value from 2 to the highest valency of the metal and p has a value from 0 to a value of 2 less than the valency of the metal M,
  (iii) a halogen containing compound and
  (iv) a Lewis Base compound, with the proviso (i) that the particulate support material is treated with the at least one organomagnesium compound, the at least one transition metal compound of Groups IVA, VA or VIA, and the one or more compounds selected from the aforesaid group, where one or more is used, prior to being treated with the at least one pacifying agent, except that where (a) the pacifying agent is a hydrogen halide (b) the particulate support material is treated with an aluminium compound of general formula $R_nAlY_{3-n}$ and (c) the particulate support material is treated with the aluminium compound of general formula $R_nAlY_{3-n}$ and the at least one organomagnesium compound separately, the pacifying agent may be added to the support after the support has been treated with the at least one organomagnesium compound and the aluminium compound of general formula $R_nAlY_{3-n}$ and before the support is treated with the at least one transition metal compound of Groups IVA, VA or VIA and (ii) that where the support is treated with two compounds selected from the aforesaid group they are not exclusively an aluminium compound $R_nAlY_{3-n}$ and an organometallic compound $R_m^1MX_p$.

Preferably the particulate support material is treated with an aluminium compound of general formula $R_nAlY_{3-n}$, more preferably prior to treatment with the at least one organomagnesium compound. Where the particulate support material is treated with an aluminium compound of general formula $R_nAlY_{3-n}$ and the pacifying agent is a hydrogen halide it is preferred that the particulate support material is treated with the at least one transition metal compound of Groups IVA, VA or VIA of the Periodic Table prior to being treated with the pacifying agent.

Where a halogen-containing compound is used, it is preferred that the support is treated with it prior to being treated with the at least one transition metal compound.

Where a Lewis base compound is used, it is preferred that the support is treated with the organomagnesium compound prior to being treated with the Lewis base compound.

All references to the Periodic Table are to the version of the Periodic Table of the Elements printed inside the back cover of "Advanced Inorganic Chemistry" by F. A. Cotton and G. Wilkinson 3rd Edition, Interscience Publishers, 1976.

By a "reactive surface" we mean a plurality of sites on, and preferably attached to, the surface of the substantially inert particulate support material, which sites are capable of abstracting, e.g. a magnesium hydrocarbyl from a solution thereof. Preferably the said sites and OH groups chemically bonded to the surface of the particulate support material and the particulate support material is an inorganic material. Such a material will be "substantially inert" in that, whereas the said —OH groups are capable of reacting with, say, the organomagnesium compound and the organometallic compound $R_m^1MX_p$ the bulk of the matrix material is chemically inert. Particularly good examples of such matrix materials are silica and alumina or mixtures thereof. These comprise a matrix of silicon or aluminium and oxygen atoms, to the surface of which —OH groups are attached, the hydrogen atoms of said groups having an acidic function. However, apart from the presence of these —OH groups, silica and alumina are generally regarded as chemically inert. Within the terms silica and alumina we include silica and alumina based materials containing small amounts of other suitable inorganic oxides, such as magnesium oxide and zinc oxide. The preferred matrices are silica and/or alumina.

The at least one organomagnesium compound used for the preparation of the catalyst components according to the invention are compounds in which at least on hydrocarbyl group is directly bonded to magnesium through a carbon atom. Preferably two hydrocarbyl groups bonded in this way are present for each magnesium atom, which hydrocarbyl groups may be the same or different, although we do not exclude the possibility that one of the groups bonded to the magnesium may be halogen or oxyhydrocarbyl. The hydrocarbyl group may be an alkyl group, aryl group, cycloalkyl group, aralkyl group, alkadienyl group or an alkenyl group. The number of carbon atoms in the hydrocarbon group is generally between 1 and 30, but this number is not critical. Examples of magnesium compounds particularly suitable for use in the process according to the invention are diethyl magnesium, dipropyl magnesium, di-isopropyl magnesium, dibutyl or diisobutyl magnesium, butyl octyl magnesium, diamyl magnesium, dihexyl magnesium, diallyl magnesium, didecyl magnesium and didodecyl magnesium, dicycloalkyl magnesium with identical or different cyclo-alkyl groups containing 3 to 12 carbon atoms, preferably 5 or 6 carbon atoms. The magnesium may further carry an alkyl and a cyclo-alkyl group. Diphenylmagnesium is the preferred aromatic compound although e.g. ditolyl-dixylyl magnesium, and magnesium aryls derived from compounds with two or more condensed or non-condensed aromatic nuclei can also be used. Catalysts prepared with diaryl magnesium compounds may have a relatively lower activity.

Preferably a dialkyl magnesium is used wherein the alkyl groups are $C_1$-$C_{10}$ groups, particularly preferably dibutyl magnesium which may be present as a mixture of dibutyl magnesiums, for example a mixture of di-n-butyl magnesium and di-iso-butyl magnesium.

In the aluminium compound $R_nAlY_{3-n}$ preferably R, where present, is alkyl, having 1 to 4 carbon atoms, more preferably ethyl or isobutyl, and preferably Y, where present, is a halide, particularly preferably chloride or bromide, more particularly preferably chloride.

Suitable aluminium compounds $R_nAlY_{3-n}$ include aluminium chloride, aluminium bromide, monoethyl aluminium dichloride, ethyl aluminium sesqui-chloride and diethyl aluminium chloride.

Where an organometallic compound $R_m^1MX_p$ is used and M is a metal from Groups IA, IIA, IIB or IIIB of the Periodic Table it is preferred that p is 0 and m is the highest valency of the metal.

Preferred organometallic compounds $R_m^1MX_p$ are those in which the metal M is a transition metal of Groups IVA, VA or VIA, more preferably titanium, vanadium, molybdenum, zirconium or chromium, and especially zirconium. The monovalent ligand X, where it is present, is preferably halogen.

Hydrocarbyl groups of different types may be associated with a single metal atom M.

Suitable hydrocarbyl groups $R^1$ include alkyl and alkenyl groups (including $\pi$-alkenyl groups such as $\pi$-allyl) and substituted derivatives thereof. Examples of transition metal complexes include tetrakis ($\pi$-allyl) zirconium or hafnium, tris ($\pi$-allyl) chromium, tetrakis ($\pi$-methallyl) zirconium or hafnium, tris ($\pi$-methallyl) chromium and zirconium tris ($\pi$-allyl) bromide.

A preferred class of organometallic compounds $R^1MX_p$ are organic transition metal complexes in which some or all of the groups, or ligands, $R^1$ are substituted alkyl groups of general formula —$CH_2Z$ $\sigma$-bonded to the transition metal through the carbon atom. In this general formula Z may represent a group capable of interaction with the vacant d-orbitals of the metal M. Preferably all the groups $R^1$ have this formula, but it is possible for some of them to comprise other hydrocarbyl or substituted hydrocarbyl groups.

Suitable substituent groups Z include aromatic and polyaromatic groups such as phenyl and naphthyl, giving rise in the formula —$CH_2Z$ to the alkaryl groups benzyl and (1-methylene-1-naphthyl) and ring substituted derivatives thereof, for example p-methyl benzyl.

Z may also be a cycloalkenyl group, such as a cyclooctenyl group.

Z may also comprise a group of general formula: $A(R^2)_3$ where A represents carbon, silicon, germanium, tin or lead, and each $R^2$, which may be the same or different, represents a hydrocarbyl group or hydrogen; preferably at least one $R^2$ is an alkyl group.

Examples of this preferred class of organometallic compounds $R^1MX_p$ include zirconium and titanium tetra(benzyl) tris(benzyl)zirconium chloride, zirconium tetrakis (p-methyl benzyl), zirconium and titanium tetrakis (1-methylene-1-naphthyl), zirconium tetrakis (trimethylsilylmethylene), zirconium tetrakis (neopentyl) and zirconium tetrakis (neophyl).

Examples of preferred organometallic compounds $R^1MX_p$ containing monovalent ligands X include tris ($\pi$-allyl) zirconium chloride, bromide or iodide and the equivalent $\pi$-methyallyl and benzyl compounds.

The halogen containing compound, where one is used, is preferably a halogenating agent and particularly preferably a chlorinating agent. Suitable halogenating agents include hydrogen halides such as hydrogen chloride, silicon halides of the formula $R_a^3Six^1(4-a)$ carboxylic acid halides of the formula $R^4cox^1$ hydrocarbyl halides of the formula $R^5x^1b$, phosphorus pentachloride, thionyl chloride, sulphuryl chloride, phosgene, nitrosyl chloride, halides of mineral acids, chlorine, bromine, chlorinated polysiloxanes, hydrocarbyl aluminium halides, aluminium, chloride, boron halides and ammonium hexafluorosilicate. Wherein, in the formulas indicated, $R^3$ is a hydrogen or a hydrocarbyl group, preferably an alkyl group containing 1 up to 6 carbon atoms or an aryl, alkaryl or aralkyl group containing 6 up to 15 carbon atoms; $R^4$ is a hydrocarbyl group, preferably an alkyl group containing 1 up to 4 carbon atoms or an aryl, alkaryl or aralkyl group containing 6 up to 12 carbon atoms; $R^5$ is a hydrocarbyl residue; $X^1$ is a halide; a is 0 or an integer from 1 up to 3; and b is an integer from 1 up to 10.

The silicon halides of formula (A) include silicon tetrachloride, silicon tetrabromide and halosilanes such as trimethyl silicon monochloride, diethyl silicon dichlodride and monobutyl silicon trichloride.

The carboxylic acid halides of formula (B) include acetyl chloride, benzoyl chloride and p-methylbenzoyl chloride.

The hydrocarbyl halides of formula (C) include carbon tetrachloride, chloroform, ethyl chloride, ethylene dichloride and 1,1,1-trichloroethane.

Halides of mineral acids include boron trichloride and antimony pentachloride.

Hydrocarbyl aluminium halides include diethyl aluminium chloride and monoethyl aluminium dichloride.

The quantity of the halogenating agent is conveniently sufficient to provide at least 0.1, and especially at least 1.0, halogen atom at every reactive site on the particulate support material. The treatment can be effected at ambient temperature or at an elevated temperature of up to 100° C. The preferred temperature is dependent on the particular halogenating agent used, for example, using silicon tetrachloride, the temperature is preferably at least 60° C. The treatment is conveniently carried out by adding the halogenating agent to a stirred suspension of the support or of the support treated with the organomagnesium compound. Using a gaseous halogenating agent such as hydrogen chloride, the gas can be passed into the reaction medium until no further absorption is observed to occur. The treatment with the halogenating agent is conveniently effected for a time of at least 0.25 up to 10 hours, preferably from 1 up to 5 hours.

After treatment with the halogenating agent, the solid reaction product is conveniently separated from the reaction medium and washed several times.

The Lewis Base compound can be any organic Lewis Base compound which has been proposed for use in a Ziegler polymerisation catalyst and which affects either the activity or stereospecificity of such a system. Thus, the Lewis Base compound may be an ether, an ester, a ketone, an alcohol, a thioether, a thioester, a thioketone, a thiol, a sulphone, a sulphonamide, a fused ring compound containing a heterocyclic sulphur atom, an organo-silicon compound such as a silane or siloxane, an amide such as formamide, urea and the substituted derivatives thereof such as tetramethylurea, thiourea, an alkanolamine, an amine, a cyclic amine such as pyridine or quinoline, a diamine such as tetramethylethylenediamine or an organo-phosphorus compound such as an organo-phosphine, an organo-phosphine oxide, an organo-phosphite or an organo-phosphate. The use of organo Lewis Base compounds is disclosed, inter alia, in British patent specifications Nos. 803,198; 809,717; 880,998; 896,509; 920,118; 921,954; 933,236; 940,125; 966,025; 969,074; 971,248; 1,013,363; 1,017,977; 1,049,723; 1,122,010; 1,150,845; 1,208,815; 1,234,657; 1,324,173; 1,359,328; 1,383,207; 1,423,658; 1,423,659 and 1,423,660.

Preferred Lewis Base compounds are esters which may be represented by the formula $R^6COOR^7$.

$R^6$ is a hydrocarbyl group which may be substituted by one or more halogen atoms and/or hydrocarbyloxy groups; and $R^7$ is a hydrocarbyl group which may be substituted by one or more halogen atoms.

The groups $R^6$ and $R^7$ may be the same or different. The group $R^6$ is conveniently an alkyl or aryl group, for example a methyl, ethyl, phenyl or tolyl group. The group $R^7$ is preferably an alkyl group containing up to 6 carbon atoms, for example an ethyl or a butyl group. It is particularly preferred that $R^6$ is an aryl group and $R^7$ is an alkyl group.

A Lewis Base compound may be added to the support treated with the organo-magnesium compound and optionally with the one halogenating agent. This is conveniently effected by adding the Lewis Base compound to a suspension, in an inert liquid medium such as an inert liquid hydrocarbon or halohydrocarbon, of the support treated with the organomagnesium compound and optionally with the halogenating agent. The quantity of Lewis Base used is conveniently in an amount of up to 1 mole of Lewis Base compound for each gramme atom of magnesium which is present on the support. Preferred quantities of the Lewis Base are from 0.1 to 0.8 mole for each gramme atom of magnesium and especially at least 0.5 up to 0.8 mole for each gramme atom of magnesium.

The addition of the Lewis Base compound to the support may be effected at temperatures of from 0° C. to 100° C. and is very conveniently carried out at ambient temperature, that is from about 15° C. up to about 30° C. After adding the Lewis Base compound to the support the materials are conveniently allowed to remain in contact for 0.1 up to 70 hours, especially 1 up to 20 hours.

After the Lewis Base compound and the support treated with the magnesium compound have remained in contact for the desired period of time, the product thus formed is conveniently separated from the reaction medium and washed with an inert liquid.

The at least one transition metal compound of Groups IVA, VA or VIA of the Periodic Table employed in the preparation of the catalyst component of the present invention may be any of the transition metal compounds, or mixtures thereof, known to be useful in forming Ziegler-Natta catalysts.

The transition metal is preferably titanium, vanadium, molybdenum, zirconium or chromium, especially titanium. Suitable compounds include halides, halooxides, alkoxides, haloalkoxides, and acetyl acetonates, especially chlorides and alkoxides. The preferred compound is titanium tetrachloride.

Suitable pacifying agents which may be employed in the preparation of catalyst components of the present invention include agents which, it is believed, are capable of breaking metal-carbon or metal-hydrogen bonds in the catalyst component but which do not have a deleterious effect on the catalyst component. Such agents include inter alia oxygen, carbon monoxide, carbon dioxide, esters and protic agents. Typically protic agents are hydrogen halides, carboxylic acids, alcohols, water, amines and acetylacetone. Preferably the pacifying agent is an aliphatic alcohol having from 1 to about 6 carbon atoms or an anhydrous hydrogen halide such as hydrogen fluoride, hydrogen chloride, hydrogen bromide or hydrogen iodide or a mixture thereof. Hydrogen halides, and particularly hydrogen chloride are preferred.

The quantity of the at least one pacifying agent used is sufficient to break substantially all the metal-hydrocarbyl or metal-hydride bonds in the catalyst component. Conveniently excess hydrogen chloride gas is bubbled through a suspension of the treated support and excess removed by sparging with nitrogen.

The molar ratio of the aluminium compound, where it is used, to the organomagnesium compound in the catalyst component of the present invention is preferably between 0.5 and 100, particularly between 1.0 and 80 and more particularly preferably between 1.0 and 10.0. The molar ratio of aluminium compound to organometallic compound $R_m^1MX_p$ is preferably between 0.1 and 100 and particularly between 1 and 20. The molar ratio of the aluminium compound to transition metal compound is preferably between 1 and 2000, particularly between 2 and 1500 and more particularly preferably between 2 and 100.

Known magnesium containing Zeigler-Natta catalyst components are often so reactive that they cannot be mixed with an olefin containing stream prior to charging the said stream to a polymerisation zone. However, the catalyst components of the present invention are often of sufficiently low polymerisation activity or are substantially completely inactive such that they can be added to the polymerisation zone in the presence of an olefin containing stream.

A further aspect of the present invention provides an olefin polymerisation catalyst which comprises (a) the catalyst component as hereinbefore defined and (b) an activator which is an organometallic compound of metals of Groups I–IV of the Periodic Table.

Preferably the activator is an organometallic derivative of a metal of Groups IA, IIA, IIB, IIIB or IVB of the Periodic Table, particularly preferably the metal is aluminium and more particularly preferable the activator is a trialkyl aluminium, dihaloalkyl aluminium or halodialkyl aluminium. It will be appreciated that sufficient of the said activator is employed to transform the metal atoms of the transition metal compound known to be useful in forming Ziegler-Natta catalysts to an active state.

The catalyst component of the present invention may be treated with the aforesaid activator by methods known in the art, for example, they may be reacted totally outside or inside the polymerisation vessel in which the catalyst is to be used or activation may be effected partially outside the polymerisation vessel and completed inside the said polymerisation vessel.

A further aspect of the present invention provides a process for the polymerisation or copolymerisation of an olefinically unsaturated monomer which process comprises contacting, under polymerisation conditions, at least one olefin monomer with a catalyst in accordance with the present invention.

The term "olefinically unsaturated monomer" is intended to include mono-olefins such as ethylene, propylene and 4-methylpentene-1.

Our catalyst may also be used to initiate the copolymerisation of two or more olefinically unsaturated monomers. For example, ethylene may be copolymerised with a small amount of propylene, butene, hexene or decene, butadiene or styrene.

Polymerisation processes according to the present invention may be carried out by techniques generally used for polymerisation processes of the type using Ziegler catalysts.

The choice of conditions of pressure and temperature will vary with factors such as the nature of the monomer and catalyst and whether liquid, e.g. bulk or diluent, or gas phase polymerisation is used.

For example, when ethylene is polymerised, pressures from sub-atmospheric to several thousand atmospheres may be used. Low pressure (say from 0.1 to 30 atmospheres) and intermediate pressure (say from 30 to 300 atmospheres) polymerisation may be carried out using conventional equipment; but very high pressure polymerisation must be performed using suitable specialised reactors and pumping equipment. However, since, generally speaking, the higher the pressure the higher the activity, the use of such techniques may be justified. If very high pressures are used, it is preferred that conditions are such that the ethylene feed and polyethylene produced are maintained in a single fluid phase, i.e. the pressure should exceed 500 Kg/cm$^2$ preferably 1000 to 3000 Kg/cm$^2$ and the temperature should be greater than 125° C., say 140°–300° C. This type of process is usually operated in a continuous manner.

A wide range of temperatures may be used, but in general low and intermediate pressure ethylene polymerisations are carried out at temperatures in the range 50°–160° C.

When the process of our invention is used to polymerise propylene, it is preferred to operate under conditions commonly used for the polymerisation of propylene. However, polymerisation of propylene under other conditions, e.g. high pressure, is not excluded.

It is also within the scope of our invention to use our compositions to initiate the copolymerisation of ethylene and propylene together and/or with other olefinically unsaturated monomers.

The polymerisation process of the present invention may be carried out in the liquid or gaseous phase (i.e. in the essential absence of a liquid medium) and preferably in the gaseous phase. Where polymerisation is effected in the liquid phase, and the monomer is not liquid under the polymerisation conditions, the monomer may be dissolved in a suitable solvent. Examples of suitable solvents are aliphatic or aromatic hydrocarbons; for instance pentane, hexane, heptane, octane, decane, benzene, toluene and mixtures thereof.

Polymerisation may be effected either in a batch manner or on a continuous basis, and the catalyst components of the present invention and the activator therefor may be introduced into the polymerisation vessel separately or the catalyst component and activator may be mixed together before being introduced into the polymerisation reactor.

Preferably however, the polymerisation process of the present invention is effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidised by the continuous flow of the gaseous monomer, and gaseous diluent to remove heat of polymerisation through the reaction zone. A suitable rate of gas flow may be readily determined by simple experiment. Make up of gaseous monomer to the circulating gas stream is at a rate equal to the rate at which particulate polymer product is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The said gas is compressed in a compressor and passed through a heat exchanger wherein it is stripped of the heat of polymerisation and then returned to the reaction zone.

Chain transfer agents may be used in a polymerisation process according to our invention, and when ethylene is polymerised their use is normally desirable as the polyethylene produced is of very high molecular weight. Hydrogen may be conveniently used in accordance with usual practice. However, some solvents may act as chain transfer agents.

Our process is preferably effected under an atmosphere free of oxygen, for example under an atmosphere of an inert gas, e.g. nitrogen, or of the monomer to be polymerised. It is also preferred to effect the process using apparatus and solvents which have been carefully freed from impurities, such as oxygen, water and other substances which would otherwise react with the catalysts.

The invention is illustrated by the following Examples.

In the example, hexane and heptane were purified by passage through $R_{3-11}$ copper catalyst and 5A molecular sieve and finally by sparging with pure nitrogen immediately before use.

Ethylene was purified by passage through $R_{3-11}$ copper catalyst and 5A molecular sieve. Hydrogen was purified by passage through a catalytic deoxygenation unit and 5A molecular sieve.

EXAMPLE 1

This example illustrates the improvement in catalyst activity obtained when an olefin polymerisation catalyst is prepared from a pacified catalyst compound.

A particulate support material comprising microspheroidal silica (Grace Davidson 952) was dried by heating at 250° C. for 2 hours under a flow of dry nitrogen.

A portion of the dried silica (18.4 gms) was slurried in 150 mls of dry, deoxygenated hexane in an atmosphere of dry nitrogen. 36.8 mls of a 1.0 M solution of ethyl aluminium dichloride in hexane was added with stirring. After 15 minutes the slurry was filtered under dry nitrogen and the solid thoroughly washed with three 100 ml portions of hexane. The solid was then resuspended in 100 mls of hexane and 30 mls of 0.62 M dibutyl magnesium in Isopar E was added with stirring. After 15 minutes a second filtration under nitrogen, followed by washing with three 100 ml portions of dry hexane, was carried out and the solid suspended in 100 mls of hexane. 18.4 mls of a 0.5 molar solution of bis-n-butoxy titanium dichloride in hexane was then added and the slurry heated to reflux for 30 minutes. The slurry was filtered and the resulting solid washed with hexane and then dried under vacuum. Analysis of the solid showed that it contained 0.355 milliatoms of titanium per gram.

A first sample of the Ti containing solid (2.9 gms) was slurried in 100 mls of heptane to give Slurry A. A second sample of the Ti containing solid (2.9 gms) was slurried in heptane, anhydrous hydrogen chloride gas was passed through the slurry for 1 minute followed by sparging with nitrogen for 15 minutes to give Slurry B. Slurries A and B were then tested as catalyst components in the polymerisation of ethylene.

The polymerisation of ethylene was carried out as follows. A commercial hydrogenator (Hydrogenation Control Unit from Electrosound Supplies Limited) was adapted to deliver ethylene to a 500 ml vessel containing 200 ml iso-octane at 20° C. The vessel was stirred with a VIBRO-MIXER E1. 2.0 ml of 0.8 M tri-n-octyl aluminium was added to the iso-octane which was then saturated with ethylene at 80° C. and the polymerisation started by addition of 1.0 ml of Slurry A. The polymerisation was stopped after 1 hour and the activity of the catalyst prepared therefrom was found to be 250 gm polymer milliatom titanium$^{-1}$ bar ethylene$^{-1}$ hours$^{-1}$. A similar experiment with Slurry B gave an activity of 436 gm polymer milliatom titanium$^{-1}$ bar ethylene$^{-1}$ hours$^{-1}$. These results indicate that a catalyst prepared from a pacified catalyst component of the present invention (Slurry B) is more active than catalyst prepared from an unpacified catalyst component (Slurry A).

What we claim is:

1. A catalyst component which is the product of reacting a particulate support material which has a reactive surface comprising a plurality of sites on the surface of the support which are capable of abstracting a magnesium hydrocarbyl from a solution thereof with (a) at least one organomagnesium compound in which magnesium is directly bonded through a carbon atom to a first hydrocarbyl group and is bonded to a halogen, or oxyhydrocarbyl or a second hydrocarbyl group, which hydrocarbyl group(s) is (are) alkyl, aryl, cycloalkyl, aralkyl, alkadienyl or alkenyl, (b) at least one aluminum compound of the general formula: $R_nAlY_{3-n}$ wherein R, each of which may be the same or different, represents a hydrocarbyl group which is an alkyl, aryl, cycloalkyl, aralkyl, or alkadienyl group, n is 0, 1, 2, 3 or a fraction less than 3 and Y is a singly charged ligand which is hydride, fluoride, chloride, bromide, iodide or oxyhydrocarbyl, (c) at least one transition metal compound of Groups IVA, VA or VIA of the Periodic Table which is known to be useful in forming Ziegler-Natta catalysts, (d) at least one pacifying agent which is capable of breaking metal-carbon or metal-hydrogen bonds in the catalyst component but does not have a deleterious effect on the catalyst component and which is used in sufficient quantity to break substantially all the metal-hydrocarbyl or metal-hydride bonds in the catalyst component, and optionally one or more compounds selected from the group consisting of an organometallic compound of the general formula: $R_m^1MX_p$ wherein M is a metal of Groups IA, IIA, IIB, IIIB, IVA, VA OR VIA of the Periodic Table, $R^1$ is a hydrocarbyl or a substituted hydrocarbyl group, X is a halogen, m is an integer up to the highest valency of the metal M and p is 0 or an integer up to 2 less than the valency of the metal M, except when M is a metal from Group VIA, p is always 0, and when M is a metal from Groups IVA, VA or VIA m has a value from 2 to the highest valency of the metal and p has a value from 0 to a value of 2 less than the valency of the metal M, a halogenating agent and a Lewis Base compound, with the proviso (i) that the particulate support material is treated with the at least one organomagnesium compound, the at least one aluminum compound of general formula $R_nAlY_{3-n}$, the at least one transition metal compound of Groups IVA, VA or VIA, and the one or more compounds selected from the aforesaid group, where one or more is used, prior to being treated with the at least one pacifying agent, except that where (a) the pacifying agent is a hydrogen halide and (b) the particulate support material is treated with the aluminum compound of general formula $R_nAlY_{3-n}$ and the at least one organomagnesium compound separately, the pacifying agent may be added to the support after the support has been treated with the at least one organomagnesium compound and the aluminum compound of general formula $R_nAlY_{3-n}$ and before the support is treated with the at least one transition metal compound of Groups IVA, VA or VIA and (ii) that where the support is treated with an organometallic compound $R_m^1MX_p$ it is treated with a halogenating agent and/or a Lewis base compound, in which catalyst component the molar ratio of the aluminum compound of general formula $R_nAlY_{3-n}$ to the organomagnesium compound is between 0.5 and 100 and the molar ratio of the aforesaid aluminum compound to the transition metal compound is between 1.0 and 2000.

2. A catalyst component as claimed in claim 1 wherein the reactive surface comprises OH groups attached to the surface of a substantially inert particulate support material.

3. A catalyst component as claimed in claim 2 wherein the particulate support material is silica and/or alumina.

4. A catalyst component as claimed in claim 1 wherein the at least one organomagnesium compound has two hydrocarbyl groups directly bonded to magnesium.

5. A catalyst component as claimed in claim 4 wherein the hydrocarbyl groups are alkyl groups having 1 to 10 carbon atoms.

6. A catalyst component as claimed in claim 5 wherein at least one of the alkyl groups is a butyl group.

7. A catalyst component as claimed in claim 1 wherein the transition metal in the at least one transition metal compound of Groups IVA, VA or VIA is titanium, zirconium, vanadium, molybdenum or chromium.

8. A catalyst component as claimed in claim 7 wherein the said compound is a halide, halo-oxide, alkoxide, haloalkoxide or acetyl acetonate.

9. A catalyst component as claimed in claim 1 wherein the at least one pacifying agent is carbon dioxide, carbon monoxide, oxygen, or a protic agent which is a hydrogen halide, carboxylic acid, alcohol, water, amine or acetylacetone.

10. A catalyst component as claimed in claim 9 wherein the protic agent is an aliphatic alcohol having from 1 to about 6 carbon atoms or an anhydrous hydrogen halide.

11. A catalyst component as claimed in claim 1 wherein the particulate support material is treated with the aluminium compound of general formula $R_nAlY_{3-n}$ prior to being treated with the at least one organomagnesium compound.

12. A catalyst component as claimed in claim 1 wherein the particulate support material is treated with the at least one transition metal compound of Groups IVA, VA or VIA of the Periodic Table prior to being treated with a pacifying agent which is a hydrogen halide.

13. A catalyst component as claimed in claim 1 wherein R is an alkyl group having 1 to 4 carbon atoms.

14. A catalyst component as claimed in claim 1 wherein Y is a halide.

15. A catalyst component as claimed in claim 1 wherein the at least one aluminium compound is selected from the group consisting of aluminium chloride, aluminium bromide, monoethyl aluminium dichloride, ethyl aluminium sesquichloride and diethyl aluminium chloride.

16. A catalyst component as claimed in claim 1 wherein M represents a metal from Groups IA, IIA, IIB or IIIB of the Periodic Table, p is O and m is the highest valency of the metal.

17. A catalyst component as claimed in claim 1 wherein M represents a transition metal of Groups IVA, VA or VIA of the Periodic Table.

18. A catalyst component as claimed in claim 17 wherein in the organometallic compound $R_m^1MX_p$, at least one of the hydrocarbyl groups $R^1$ is π-allyl or π-methallyl.

19. A catalyst component as claimed in claim 18 wherein the organometallic compound is selected from the group consisting of tetrakis (π-allyl)zirconium and hafnium, tris (π-allyl)chromium, tetrakis(π-methallyl)zirconium and hafnium, tris(π-methallyl)chromium and zirconium tris (π-allyl)bromide.

20. A catalyst component as claimed in claim 17 wherein in the organometallic compound $R_m^1MX_p$, at least one of the hydrocarbyl or substituted hydrocarbyl groups $R^1$ has the formula $-CH_2Z$ and is sigma-bonded to the transition metal M through the carbon atom where Z is a mono or polyaromatic group, cycloalkenyl group or the group $-A(R^2)_3$ where A represents carbon, silicon, germanium, tin or lead and $R^2$ represents a hydrocarbyl or substituted hydrocarbyl group or hydrogen.

21. A catalyst component as claimed in claim 20 wherein $-CH_2Z$ is selected from the group consisting of benzyl, 1-methylene-1-naphthyl, p-methylbenzyl, trimethylsilylmethane, neopentyl and neophyl.

22. A catalyst component as claimed in claim 21 wherein the at least one organometallic compound $R_m^1MX_p$ is selected from the group consisting of zirconium and titanium tetrabenzyl, tris(benzyl)zirconium chloride, zirconium tetrakis (p-methylbenzyl), titanium and zirconium (1-methylene-1-naphthyl), zirconium tetrakis(trimethylsilylmethylene), zirconium tetrakis(neopentyl) and zirconium tetrakis (neophyl).

23. A catalyst component as claimed in claim 1 wherein the halogen containing compound is a halogenating agent.

24. A catalyst component as claimed in claim 23 wherein the halogenating agent is selected from the group consisting of hydrogen halide, phosphorus pentachloride, thionyl chloride, sulphuryl chloride, phosgene nitrosyl chloride, halides of mineral acids, chlorine, bromine, chlorinated polysiloxanes, hydrocarbyl aluminium halides, aluminium chloride, boron halides, ammonium hexafluorosilicate, silicon halides $R^3SiX^1_{(4-a)}$ where $R^3$ is hydrogen or a hydrocarbyl group, $X^1$ is a halide, and a is 0 or an integer from 1 to 3, $R^4COX^1$ and $R^5X_b^1$ where $R^4$ and $R^5$ are hydrocarbyl groups, $X^1$ has the meaning hereinbefore ascribed to it and b is an integer from 1 to 10.

25. A catalyst component as claimed in claim 1 wherein the Lewis Base compound is an ester of formula $R^6COOR^7$ wherein $R^6$ is a hydrocarbyl group which may be substituted with one or more halogen atoms and/or hydrocarbyloxy groups and $R^7$ is a hydrocarbyl group which may be substituted with one or more halogen atoms.

26. A catalyst component as claimed in claim 25 wherein $R^6$ is an aryl group and $R^7$ is an alkyl group.

27. An olefinic polymerisation catalyst comprising a catalyst component as claimed in claim 1 activated with a suitable activator which is an organometallic compound of a metal of Groups I to IV of the Periodic Table which is known to be useful as an activator for Ziegler-Natta catalysts.

28. An olefin polymerisation catalyst as claimed in claim 27 wherein the said metal is from Groups IA, IIA, IIB, IIIB or IVB of the Periodic Table.

29. A catalyst as claimed in claim 28 wherein the said metal is aluminium.

30. A process for the preparation of a catalyst component as claimed in claim 1 comprising the steps of reacting the particulate support material which has a reactive surface comprising a plurality of sites on the surface of the support which are capable of abstracting a magnesium hydrocarbyl from a solution thereof with (a) at least one organomagnesium compound in which magnesium is directly bonded through a carbon atom to a first hydrocarbyl group and is bonded to a halogen, or oxyhydrocarbyl or a second hydrocarbyl group, which hydrocarbyl group(s) is (are) alkyl, aryl, cycloalkyl, aralkyl, alkadienyl or alkenyl, (b) at least one aluminum compound of the general formula: $R_nAlY_{3-n}$ wherein R, each of which may be the same or different, represents a hydrocarbyl group which is an alkyl, aryl, cycloalkyl, aralkyl, or alkadienyl group, n is 0, 1, 2, 3 or a fraction less than 3 and Y is a singly charged ligand which is hydride, fluoride, chloride, bromide, iodide or oxyhydrocarbyl, (c) at least one transition metal compound of Groups IVA, VA or VIA of the Periodic Table which is known to be useful in forming Ziegler-Natta catalysts, (d) at least one pacifying agent which is capable of breaking metal-carbon or metal-hydrogen bonds in the catalyst component but does not have a deleterious effect on the catalyst component and which is used in sufficient quantity to break substantially all the metal-hydrocarbyl or metal-hydride bonds in the catalyst component, and optionally one or more compounds selected from the group consisting of an organometallic compound of the general formula: $R_m{}^1MX_p$ wherein M is a metal of Groups IA, IIA, IIB, IIIB, IVA, VA or VIA of the Periodic Table, $R^1$ is a hydrocarbyl or a substituted hydrocarbyl group, X is a halogen, m is an integer up to the highest valency of the metal M and p is 0 or an integer up to 2 less than the valency of the metal M, except when M is a metal from Group VIA p is always 0, and when M is a metal from Groups IVA, VA or VIA m has a value from 2 to the highest valency of the metal and p has a value from 0 to a value of 2 less than the valency of the metal M, a halogenating agent and a Lewis Base compound, with the proviso that the particulate support material is treated with the at least one organomagnesium compound, the at least one aluminum compound of general formula $R_nAlY_{3-n}$, the at least one transition metal compound of Groups IVA, VA or VIA, and the one or more compounds selected from the aforesaid group, where one or more is used, prior to being treated with the at least one pacifying agent, except that where (a) the pacifying agent is a hydrogen halide and (b) the particulate support material is treated with the aluminum compound of general formula $R_nAlY_{3-n}$ and the at least one organomagnesium compound separately, the pacifying agent may be added to the support after the support has been treated with the at least one organomagnesium compound and the aluminum compound of general formula $R_nAlY_{3-n}$ and before the support is treated with the at least one transition metal compound of Groups IVA, VA or VIA and (ii) that where the support is treated with an organometallic compound $R_m{}^1MX_p$ it is treated with a halogenating agent and/or a Lewis base compound, in which catalyst component the molar ratio of the aluminum compound of general formula $R_nAlY_{3-n}$ to the organomagnesium compound is between 0.5 and 100 and the molar ratio of the aforesaid aluminum compound to the transition metal compound is between 1.0 and 200.

* * * * *